United States Patent
Smart et al.

(10) Patent No.: US 11,288,217 B2
(45) Date of Patent: Mar. 29, 2022

(54) CONTROLLER AREA NETWORK SAMPLE POINT DETECTION

(71) Applicant: Deere & Company, Moline, IL (US)

(72) Inventors: David C. Smart, Waterloo, IA (US); Kerry S. Martin, Wellsburg, IA (US)

(73) Assignee: Deere & Company, Moline, IL (US)

( * ) Notice: Subject to any disclaimer, the term of this patent is extended or adjusted under 35 U.S.C. 154(b) by 150 days.

(21) Appl. No.: 16/884,458

(22) Filed: May 27, 2020

(65) Prior Publication Data

US 2021/0374081 A1 Dec. 2, 2021

(51) Int. Cl.
*G06F 11/00* (2006.01)
*G06F 13/20* (2006.01)
*G06F 11/07* (2006.01)
*H04L 12/40* (2006.01)

(52) U.S. Cl.
CPC .......... *G06F 13/20* (2013.01); *G06F 11/0709* (2013.01); *G06F 11/0751* (2013.01); *H04L 2012/40215* (2013.01)

(58) Field of Classification Search
CPC ............. G06F 11/0739; G06F 11/3013; G06F 11/3072; G06F 11/0709; G06F 11/0751
See application file for complete search history.

(56) References Cited

U.S. PATENT DOCUMENTS

| | | | |
|---|---|---|---|
| 10,922,264 B1 * | 2/2021 | Adamson | H04B 1/38 |
| 2012/0155285 A1 * | 6/2012 | Smart | H04L 41/0609 370/242 |
| 2016/0094312 A1 * | 3/2016 | Fredriksson | H04L 1/0061 714/807 |
| 2020/0213351 A1 * | 7/2020 | Shin | H04L 12/40 |

OTHER PUBLICATIONS https://www.vector.com/us/en/products/products-a-z/hardware/vh6501/, 5 pages, retrieved on Sep. 9, 2020.
https://assets.vector.com/cms/content/know-how/_press-releases/VH6501_PresseRelease_201808_EN.pdf, Aug. 20, 2018, 2 pages.
https://assets.vector.com/cms/content/events/2018/Webinars18/Vector_Webinar_VH6501_20180220.pdf, Feb. 13, 2018, 15 pages.
https://assets.vector.com/cms/content/products/VH6501/Docs/VH6501_Manual_EN.pdf, 37 pages, retrieved on Sep. 9, 2020.

\* cited by examiner

*Primary Examiner* — Charles Ehne
(74) *Attorney, Agent, or Firm* — Joseph R. Kelly; Kelly, Holt & Christenson PLLC

(57) ABSTRACT

The transmission of a recessive bit in a CAN message from a transmitting electronic control unit (ECU) is detected, over a controller area network. A dominant pulse is injected onto the network after a delay time into the detected recessive bit. Behavior of the transmitting ECU is detected, and a sample point for the transmitting ECU is characterized based upon the detected ECU behavior. An action signal is generated based upon the characterized sample point.

20 Claims, 7 Drawing Sheets

CONTROLLER AREA NETWORK SAMPLE POINT DETECTION

FIELD OF THE DESCRIPTION

The present description relates to computing using a controller area network. More specifically, the present description relates to detecting and configuring a sample point in an electronic control unit that operates over a controller area network.

BACKGROUND

Controller area network (CAN) communication is performed using a well-documented protocol. Computing systems are used to run configuration logic for configuring electronic control units to communicate using CAN communications. This often involves configuring things which can be directly measured, such as a signaling rate, as well as things which are not directly measurable, such as the CAN sample point.

More specifically, a single CAN message (or network packet) is normally composed of a serial bit stream, which can vary from approximately 60 bits in length, to well over 100 bits in length. Each individual bit has a specific set of configuration elements which, together, determine the time-length of the bit (or bit length). The time-length of the bit, in turn, determines the signaling bit rate.

The electronic control unit (ECU) is also configured with a sample point. The sample point defines a point within the bit length (or bit period) at which the state of the bit is sampled by the ECU. The location of the sample point within the bit length can greatly affect the accuracy with which the ECU interprets the state of the bit.

The discussion above is merely provided for general background information and is not intended to be used as an aid in determining the scope of the claimed subject matter.

SUMMARY

The transmission of a recessive bit in a CAN message from a transmitting electronic control unit (ECU) is detected, over a controller area network. A dominant pulse is injected onto the network after a delay time into the detected recessive bit. Behavior of the transmitting ECU is detected, and a sample point for the transmitting ECU is characterized based upon the detected ECU behavior. An action signal is generated based upon the characterized sample point.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
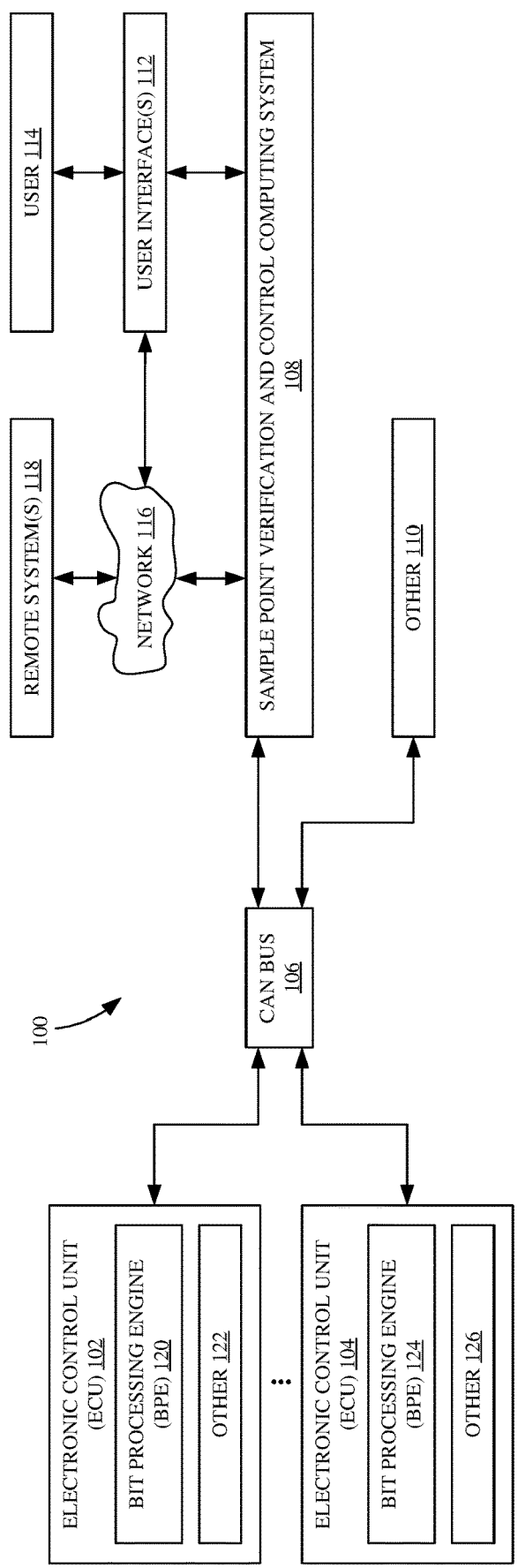
FIG. 1 is a block diagram of one example of a CAN bus architecture.

As discussed above, the location of a controller area network (CAN) sample point used by an electronic control unit (ECU) on a CAN bus can greatly affect the accuracy and reliability with which the ECU operates on the CAN bus. However, the CAN sample point is not directly measurable.

An individual bit, in a CAN message transmitted by an ECU, has a bit length (or bit period) that is defined in terms of a number of time quanta ($t_q$), where $t_q$ is often derived from a higher speed clock source, such as that of a host microprocessor, divided down by a pre-scaler. The bit is also subdivided into time segments, each represented by some integer number of time quanta, $t_q$. The time segments are often referred to as time segment 1 (tseg1) and time segment 2 (tseg2). The overall bit period in units of $t_q$ is defined as:

$$1 + tseg1 + tseg2 \qquad \text{Equation 1}$$

The number of time quanta in tseg1 and the number of time quanta in tseg2 are often set by a value that is tracked in a pair of registers in a CAN controller (or ECU). Some other CAN controllers have an additional register, which tracks a propagation delay segment (propseg) which is related to the propagation delay in the overall network. In such a system, the overall bit period (or bit length) is determined as follows:

$$1 + propseg + tseg1 + tseg2 \qquad \text{Equation 2}$$

The sample point in the bit periods or bit lengths defined by both Equation 1 and Equation 2 above is located at the end of tseg1. This means that, within a single bit, the ECU that is sampling that bit waits until the end of tseg1, within that bit, to sample the state of the bit.

More specifically, a CAN message starts with a specific "start bit" which is a transition from a logic 1 (recessive state) to a logic 0 (dominant state). At the beginning of the defined bit period, the transmitting ECU applies the state of the next bit to the network. The state of the next bit could be the same state as the previous bit or an alternate state from the previous bit. Each CAN message also has a header. The header includes a CAN identifier field. Some protocols include, in the CAN identifier field, a source address of the transmitting node. The source address (also referred to herein as the ECU identifier field) can be used to identify which ECU, in a network of ECUs, transmitted the message. The CAN identifier field is also used as an arbitration field. The arbitration field is used to obtain control of the CAN bus. The header can include other bits used for other things as well. A CAN message also includes a data portion.

The physical characteristics of many CAN bus systems involve the CAN transceiver, harness wiring, and other electrical characteristics involving termination, splicing and connectors. Systems with a CAN bus also sometimes have many other circuits, often in close proximity to the CAN bus. Thus, it is very common for electrical transients to appear on a CAN bus. Such electrical transients can include such things as signal ringing due to harness characteristics. Transients can also be coupled to the CAN bus from other circuits that are closely proximate the CAN bus. Transients can come from other sources as well. The transients often occur near the boundary between bit periods.

Therefore, transmitters and receivers of a CAN message must be in very precise time synchronization. This is often done by accurately detecting bit transitions, with local timing, based upon the $t_q$ clock in the receiving controller, and based upon the time segment configurations in both the transmitting and receiving controllers.

CAN ECUs normally process bits in a CAN message using a bit processing engine (BPE). Upon seeing a transition in the signal at or near the expected point in time where bit transition could exist, the BPE then needs to determine the state of that individual bit. If the BPE were to sample the bit-state too soon after a transition (e.g., too close to the start of the bit period), it could pick up electrical noise (such as ringing) and misinterpret that ringing as the bit having the wrong logical state (1 or 0). This is the reason that the ECUs have the tseg1 and tseg2 registers. These register values can be used to control when the BPE samples the state of the bit.

One problem that is often encountered in CAN communication is the incorrect configuration of the tseg1 and tseg2 values, which results in the incorrect implementation of the sample point. Many combinations of the tseg1 and tseg2 settings can yield the correct bit rate, which is based on the sum of the tseg1 and tseg2 values. However, an incorrect configuration of the tseg1 and tseg2 values, while yielding the correct bit rate, may also result in a poor choice of sample point (placing it either too early or too late in the bit period). Because the sample point is normally internal to the BPE, there is no direct means of measuring the sample point, as there is with the bit stream itself. Thus, it can be difficult to determine whether the sample point for an ECU is misconfigured.

To exacerbate this problem, CAN ECUs have built-in mechanisms for detecting transmission or detection errors and retrying the failing transfer. Thus, where an ECU has its sample point marginally misconfigured, the retry mechanisms can mask the errors or the misconfiguration, so that the errors are overlooked by engineers during product development. This can risk a marginal configuration escaping into production.

The present description thus proceeds with respect to determining the actual sample point implementation in a configured ECU. The start of a recessive bit transmission in a CAN message is identified and a dominant value is transmitted onto a network by a sample point verification and control computing system. The behavior of the transmitting ECU is monitored to determine whether the transmitting ECU detected the dominant bit. If it did, then this means that the dominant bit was injected at the sample point of the transmitting ECU. If not, the location at which the dominant bit is injected into the bit period is moved, within a recessive bit period, and the dominant bit injection is repeated, at different locations within the bit period, until the sample point of the transmitting ECU is adequately characterized.

FIG. 1 is a block diagram of one example of a CAN bus architecture 100. CAN bus architecture 100 may be deployed on a mobile work machine, such as an automotive machine, an agricultural machine, a turf management machine, a construction machine, a forestry machine, among others. In the example shown in FIG. 1, CAN bus architecture 100 has a plurality of different electronic control units (ECUs) 102 and 104 connected for communication with one another over CAN bus 106. FIG. 1 also shows that sample point verification and control computing system 108 can be connected to ECUs 102 and 104 over CAN bus 106. A variety of other items 110 can also be connected to CAN bus 106.

In the example shown in FIG. 1, computing system 108 can generate user interfaces 112 for interaction by user 114. User 114 may, for instance, be an engineer who is evaluating the performance of ECUs 102 and 104. In one example, user 114 interacts directly with computing system 108 through user interfaces 112. In another example, user 114 interacts, through user interfaces 112, over a network 116. One or more remote systems 118 can also be connected to architecture 100 through network 116. Thus, network 116 can be a wide area network, a local area network, a near field communication network, a cellular communication network, or any of a wide variety of other networks or combinations of networks.

User interface logic 152 illustratively generates user interfaces 112 and detects user interaction with those user interfaces. The user interfaces can be generated on user interface mechanisms, such as a screen or monitor, a touch sensitive display screen, another visual output mechanism, an audio or haptic output mechanism, etc. Logic 152 can detect user interactions with user actuatable elements on the user interface mechanisms. Those elements can include icons, links, touch sensitive buttons that are actuated by touch gestures, point and click devices, among other things.

In the example shown in FIG. 1, ECU 102 has a bit processing engine (or BPE) 120 and it can have a wide variety of other ECU functionality 122. ECU 104 also has a bit processing engine (BPE) 124, and it can have a wide variety of other ECU functionality 126 as well.

The bit processing engine 120 transmits and receives CAN messages over CAN bus 106. The CAN messages can be sent for consumption by other ECUs. Thus, each of the BPEs 120-124 includes the logic that is used for transmitting, receiving, and sampling bits in CAN messages.

In one example, sample point verification and control computing system 108 injects dominant pulses into CAN messages. If system 108 injects a dominant pulse at a location within a bit length (or bit period) that does not correspond to the sample point of the transmitting ECU (e.g., the sample point of ECU 102), then ECU 102 will ignore the injected pulse and continue to transmit. However, if system 108 injects the pulse at a location within a bit length that corresponds to the sample point of ECU 102, then ECU 102 will see that the bit has a value that it did not transmit. When an ECU 102 is transmitting a message and it sees a bit value that it did not transmit, then, if the bit is in the arbitration field of the CAN message it is transmitting, ECU 102 will assume that it has not won an arbitration to obtain control of CAN bus 106, and it will stop transmitting. In another example, when ECU 102 sees a bit that has a value that it did not transmit, and the bit is in the data field of the CAN message, ECU 102 generates a CAN error. By injecting pulses at different locations within a bit length, system 108 can monitor the behavior of the transmitting ECU in response to the injected pulse and identify the location of the sample point of that ECU, within a bit length (or bit period).

The sample point of the ECUs 102 and 104 can thus be identified and surfaced through user interfaces 112 for user 114. They can also be sent to remote systems 118 over network 116. System 108 can also determine whether the sample point for a particular ECU is in an undesirable position (such as too close to the beginning of the bit, or too close to the end of the bit) so that a receiving ECU may misinterpret the bit value because of ringing or other transients that occur at the beginning and/or end of the bit length.

Figure 2:
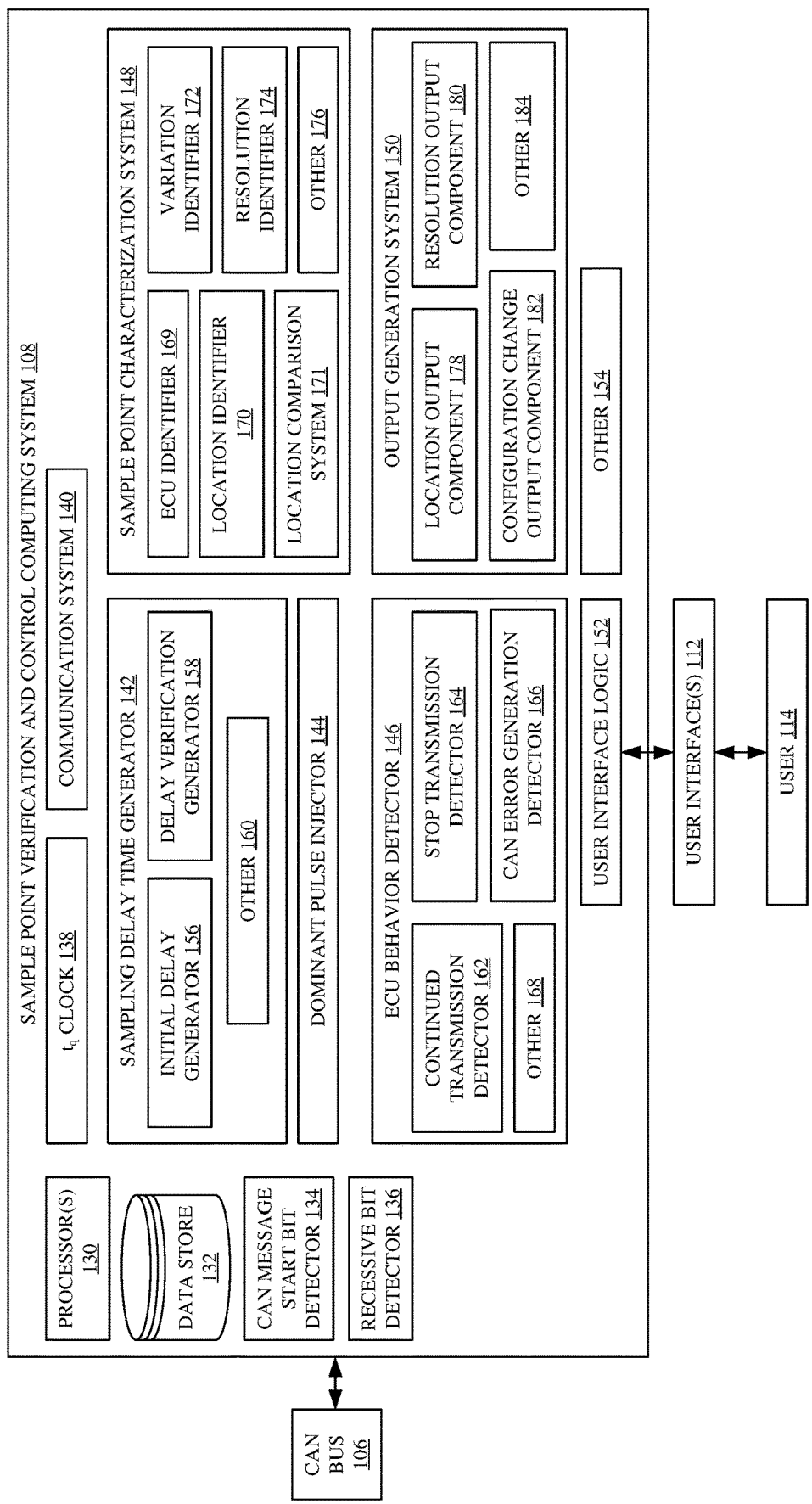
FIG. 2 is a block diagram showing one example of a sample point verification and control computing system, in more detail.

FIG. 2 is a block diagram illustrating one example of sample point verification and control computing system 108, in more detail. Some items are similar to those shown in FIG. 1, and they are similarly numbered. FIG. 2 shows that computing system 108 illustratively includes one or more processors 130, data store 132, CAN message start bit detector 134, recessive bit detector 136, $t_q$ clock 138, communication system 140, sampling delay time generator 142, dominant pulse injector 144, ECU behavior detector 146, sample point characterization system 148, output generation system 150, user interface logic 152, and it can include a wide variety of other items 154. Sampling delay time generator 142, itself, can include initial delay generator 156, delay variation generator 158, and it can include other items 160. ECU behavior detector 146 can include continued transmission detector 162, stop transmission detector 164, CAN error generation detector 166, and it can include other items 168. Sample point characterization system 148 can include ECU identifier 169, location identifier 170, location comparison system 171, variation identifier 172, resolution identifier 174, and it can include other items 176. Output generation system 150 can include location output component 178, resolution output component 180, configuration control output component 182, and it can include a wide variety of other items 184. Before describing the operation of sample point verification and control computing system 108 in more detail, a brief description of some of the items in computing system 108, and their operation, will first be provided.

The $t_q$ clock illustratively generates high frequency clock pulses that may be used as timing circuitry for processor 130, or otherwise. They are illustratively high frequency relative to a bit length (or bit period) of a bit transmitted as part of a CAN message on CAN bus 106. Thus, the time quanta identified by $t_q$ clock 138 (or which may be identified by scaling the output of $t_q$ clock 138) can be used to identify the bit length of each bit in a CAN message. Further, they can be used to activate tseg1 and tseg2 registers (not shown) as well as being used for other timing functions. This is described in greater detail below.

Communication system 140 illustratively allows items in system 108 to communicate with one another and computing system 108 to communicate over network 116 (shown in FIG. 1). Therefore, communication system 140 may vary based upon the type of network 116 it is to communicate over.

CAN message start bit detector 134 illustratively receives a CAN message and detects a start bit for the CAN message. Recessive bit detector 136 detects recessive bits that are transmitted as part of the CAN message. Sampling delay time generator 142 generates a delay time, within a bit length, that computing system 108 waits before it injects a dominant pulse. Initial delay generator 156 can generate an initial delay value, while delay variation component 158 varies the delay, as is discussed in greater detail below, so that computing system 108 can identify and characterize the sample point of the transmitting ECU that transmitted the CAN message under analysis.

Dominant pulse injector 148 injects a dominant pulse onto CAN bus 106 after the delay identified by sampling delay time generator 142 into a detected recessive bit. ECU behavior detector 146 then detects the behavior of the transmitting ECU, in response to the injected dominant pulse. Continued transmission detector 162 detects when the transmitting ECU continues transmitting (e.g., it detects that the transmitting ECU has ignored the dominant pulse, meaning that the dominant pulse was not injected at the sample point of the transmitting ECU). Stop transmission detector 164 detects that the transmitting ECU has stopped transmission in response to the injected pulse. For instance, if the injected pulse is injected during the arbitration portion of the CAN message where the transmitting ECU is asserting a recessive bit, then the transmitting ECU will determine that it has not won the arbitration, and will stop transmitting. This is detected by detector 164. Can error generation detector 166 detects when the transmitting ECU generates a CAN error. For instance, when the dominant pulse is injected after the arbitration period of the CAN message (and during the data portion), then the transmitting ECU will interpret the injected pulse (if it is injected at the sample point) as a value that is different from the one that the transmitting ECU transmitted, and the transmitting ECU will thus generate a CAN error.

Sample point characterization system 148 then characterizes the sample point based on the behavior of the transmitting ECU in response to the injected pulse. That is, it identifies a number of characteristics of the sample point that may be used in reconfiguring the transmitting ECU to move the sample point within the bit length, if desired. ECU identifier 169 identifies the transmitting ECU in an example where the entire ECU identifier field is received before the dominant pulse is injected. Location identifier 170 identifies the location (in terms of time quanta, or otherwise) of the sample point within the bit length. Location comparison system 171 compares the location of the sample point to a desired location. Variation identifier 172 can be used to identify a variation in the locations of sample points used by the different ECUs on the CAN bus. Resolution identifier 174 can be used to identify the resolution of the bit length or bit period (e.g., the number of time quanta in the bit length or bit period).

Based upon the characteristics of the sample point, output generation system 170 generates an output. For instance, location output component 178 generates an output (that can be surfaced, along with the identity of the transmitting ECU by inspection of the CAN identifier field, for user 114 on user interfaces 112) indicative of the location of the sample point within the bit length. Resolution output component 180 can generate an output indicative of the resolution that the transmitting ECU is using, and configuration control output component 182 can generate a control output for modifying the configuration of the transmitting ECU (e.g., to increase its resolution, to reconfigure it to move the location of the sample point, etc.). Sample point configuration control output component 182 can generate an output that is automatically used to reconfigure the transmitting ECU. By automatically, it is meant that the operation is performed without any further human involvement except, perhaps, to initiate or authorize the operation. In another example, component 182 can generate an action signal that is output on user interfaces 112, by user interface logic 152, so that user 114 can use that information to reconfigure the transmitting ECU.

Figure 3A:
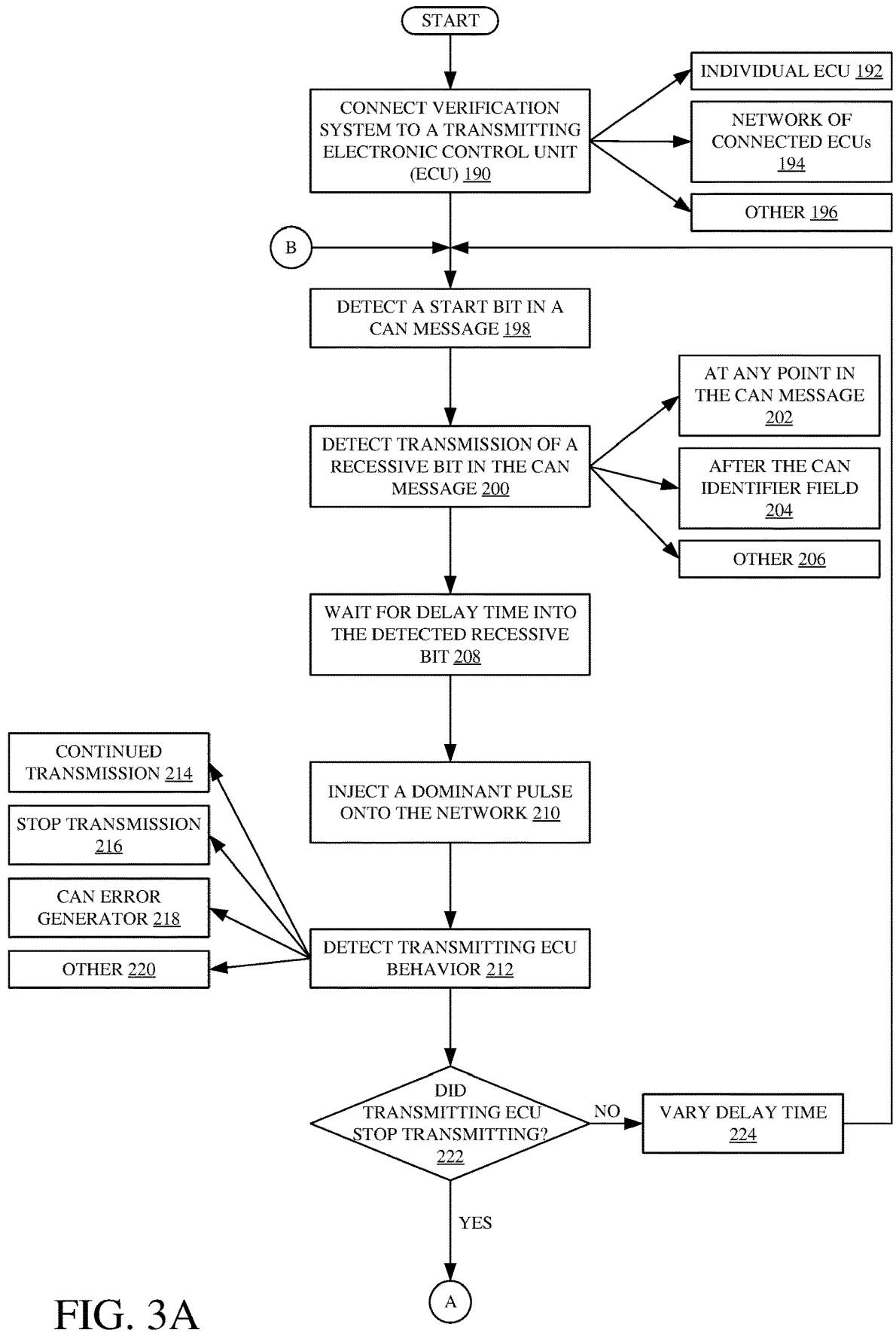
FIGS. 3A and 3B (collectively referred to herein as FIG. 3), show one example of the operation of the sample point verification and control computing system in identifying a sample point for an ECU.
Figure 3B:
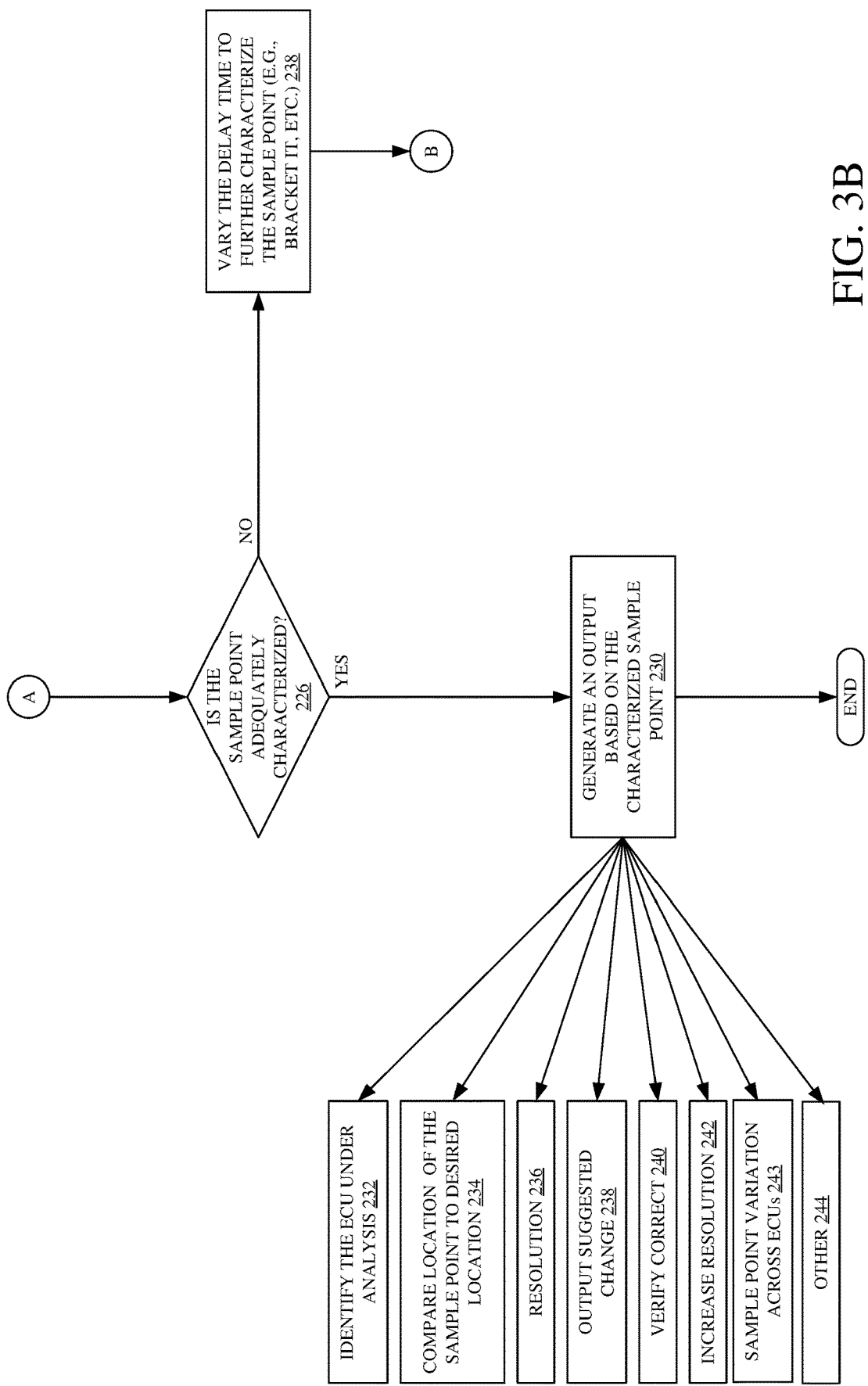

FIGS. 3A and 3B (collectively referred to herein as FIG. 3) show a flow diagram illustrating one example of the operation of sample point verification and control computing system 108 in identifying the sample point for a transmitting ECU, and generating an output based upon the characterized sample point. It is first assumed that sample point verification and control computing system 102 is coupled to receive CAN messages from a transmitting ECU. This is indicated by block 190 in the flow diagram of FIG. 3. In one example, system 108 can be coupled to an individual ECU to verify and control its sample point. This is indicated by block 192. In another example, computing system 108 can be coupled to a network of connected ECUs. This is indicated by block 194. In such a scenario, computing system 108 can receive CAN messages from any of a number of different ECUs in the network. Computing system 108 can be connected to ECUs in other ways as well. This is indicated by block 196. In the present example, it will be assumed that ECU 102 is the transmitting ECU.

CAN message start bit detector 134 then detects the start bit of a CAN message that has been transmitted by ECU 102 over CAN bus 106. Detecting the start bit is indicated by block 198 in the flow diagram of FIG. 3.

Recessive bit detector 136 then detects a recessive bit within the CAN message. This is indicated by block 200 in the flow diagram of FIG. 3. In one example, recessive bit detector 136 detects the presence of the first recessive bit, no matter where it is located in the CAN message. This is indicated by block 202. In another example, recessive bit detector 136 detects the recessive bit at a location in the CAN message after the ECU identifier field, which may be part of the arbitration field, or a separate field of the CAN message. Detecting the recessive bit after receiving the ECU identifier field is indicated by block 204 in the flow diagram of FIG. 3. The recessive bit can be detected in other ways as well, and this is indicated by block 206.

Initial delay generation 156 outputs an initial delay period indicative of a number of time quanta that dominant pulse injector 144 is to wait, within the bit length of the recessive bit, in order to inject the dominant pulse. Waiting for the initial delay in the recessive bit length is indicated by block 208 in the flow diagram of FIG. 3. Dominant pulse injector 144 then injects a dominant pulse, at the location in the recessive bit length, after the delay. This is indicated by block 210 in the flow diagram of FIG. 3. The width (or temporal length) of the dominant pulse can be varied.

ECU behavior detector 146 then detects the behavior of the transmitting ECU 102, in response to the injected dominant pulse. This is indicated by block 212. Continued transmission detector 162 detects whether the transmitting ECU 102 continues to transmit, indicating that it has ignored the injected pulse. This is indicated by block 214. Stop transmission detector 164 detects whether the transmitting ECU has stopped transmitting. This is indicated by block 216. This may be the case where the transmitting ECU 102 has detected the injected pulse in the arbitration field of the CAN message. CAN error generation detector 166 detects whether the transmitting ECU 102 has generated a CAN error. This is indicated by block 218. This may be the case where the transmitting ECU 102 detects the injected pulse in the data field portion (or at some portion after the arbitration field) in the CAN message. In one example, the ECU behavior detector 146 may be able to detect other behaviors of the transmitting ECU 102 as well. This is indicated by block 220.

If ECU behavior detector 146 determines that the transmitting ECU 102 did not stop transmitting, then an indication of this output is provided to sampling delay time generator 142. Delay variation generator 158 then changes the delay time into the bit period at which a dominant pulse is to be injected and processing reverts to block 198 where computing system 108 waits for another CAN message to be received from the transmitting ECU 102 and waits to inject the dominant pulse at a different location in the bit period, based on the varied delay output by delay variation generator 158. Determining whether the transmitting ECU stopped transmitting in response to the injected dominant pulse is indicated by block 222 in the flow diagram of FIG. 3. Varying the delay time using delay variation generator 158 (when the transmitting ECU 102 has ignored the injected dominant pulse) is indicated by block 224 in the flow diagram of FIG. 3.

Sample point characterization system then determines whether the sample point has been adequately characterized. This is indicated by block 226. For example, it may be that the system only needs ECU identifier 169 to identify the particular ECU 102 under test (where a network of ECUs is being tested), and location identifier 170 to identify the location of the sample point for the identified ECU. The location of the sample point will correspond to the delay, within the bit length, when the dominant pulse was injected, and the transmitting ECU stopped transmitting. In one example, this is all the characterization that is done—identifying the location, within the bit period, of the sample point for the transmitting ECU 102.

In another example, location comparison system 171 can also compare the location of the sample point to a desired sample point location (one which is located far enough from the beginning and ending of the bit length to avoid corruption by ringing or other transients). Location comparison system 171 then outputs an indication of how the location of the sample point for the transmitting ECU under test compares to the desired sample point location.

However, it may be that sample point characterization system 148 is configured to perform even further characterization of the sample point. By way of example, it may be that system 148 is to detect a variation in the locations of sample points of the different ECUs on the CAN bus, or the resolution (in terms of time quanta) being used by the transmitting ECU 102. In that case, delay variation generator 158 varies the delay to more closely identify the beginning and ending of the bit length. For instance, the dominant pulse may be injected to identify the earliest sample point of the networked ECUs, and then the delay can be varied so the dominant pulse is injected to identify the latest sample point of the networked ECUs.

Thus, if sample point characterization system 148 determines that more dominant pulses need to be injected to further characterize the sample point, then delay variation generator 158 again varies the delay, and processing again reverts to block 198 where computing system 108 waits to receive another CAN message from the transmitting ECU 102 and inject another dominant pulse. Varying the delay time to further characterize the sample point is indicated by block 228 in the flow diagram of FIG. 3.

In this way, ECU identifier 169 in sample point characterization system 148 can identify the ECU being tested. Location identifier 170 can identify the location of the sample point within a bit length. The location of the sample point can be compared by location comparison system 171 to a desired sample point location. Resolution identifier 174 can identify the resolution being used by the transmitting ECU 102. Variation identifier 172 can detect or verify a variation in the locations of sample points for the EUCs. Any or all of these characteristics, and/or other characteristics can then be provided to output generation system 150 for generation of an output, based upon the characterized sample point. Generating an output based on the characterized sample point is indicated by block 230 in the flow diagram of FIG. 3.

Output generation system 150 can thus generate an output that identifies the ECU 102 under analysis. This is indicated by block 232.

Location output component 178 can generate an output identifying the location of the sample point of the transmitting ECU 102, within the bit length. It can also generate an output indicating how that location compares to a desired location of the sample point, within the bit length. This is indicated by block 234 in the flow diagram of FIG. 3. Resolution output component 180 can output the resolution 236 being used by the transmitting ECU 102.

Configuration change output component 182 can also generate outputs to change the configuration of the transmitting ECU 102. It can surface suggested changes, using user interface logic 152, on user interfaces 112, where user 114 can observe, and make the configuration changes to the transmitting ECU 102. In another example, component 182 can generate output signals to automatically change the configuration of the transmitting ECU 102. For instance, where the location of the sample point for the transmitting ECU 102 is to be changed within a bit length, component 182 can generate configuration output signals that are applied to the transmitting ECU 102, over CAN bus 106, in order to change its configuration. Outputting suggested changes is indicated by block 238 in the flow diagram of FIG. 3.

It may be that sample point characterization system 148 generates an output indicating that the sample point is in the correct position (or is positioned within an acceptable range). In that case, location output component 178 can generate an output verifying that the sample point is correct or acceptable. This is indicated by block 240 in the flow diagram of FIG. 3. Resolution output component 180 can generate an output indicative of the resolution being used by the transmitting ECU 102, and it can also generate an output signal to suggest reconfiguring the transmitting ECU 102 to increase or otherwise change its resolution. Component 180 can generate signals to automatically reconfigure the transmitting ECU 102 to change its resolution as well. Outputting signals for changing the resolution being used by the transmitting ECU 102 is indicated by block 242. Output generation system 150 can also output a variation indicator indicating variations in the locations of the sample point for the networked ECUs on the CAN bus. This is indicated by block 243. Output generation system 150 can generate a wide variety of other outputs, in other ways as well, and this is indicated by block 244.

Figure 4:
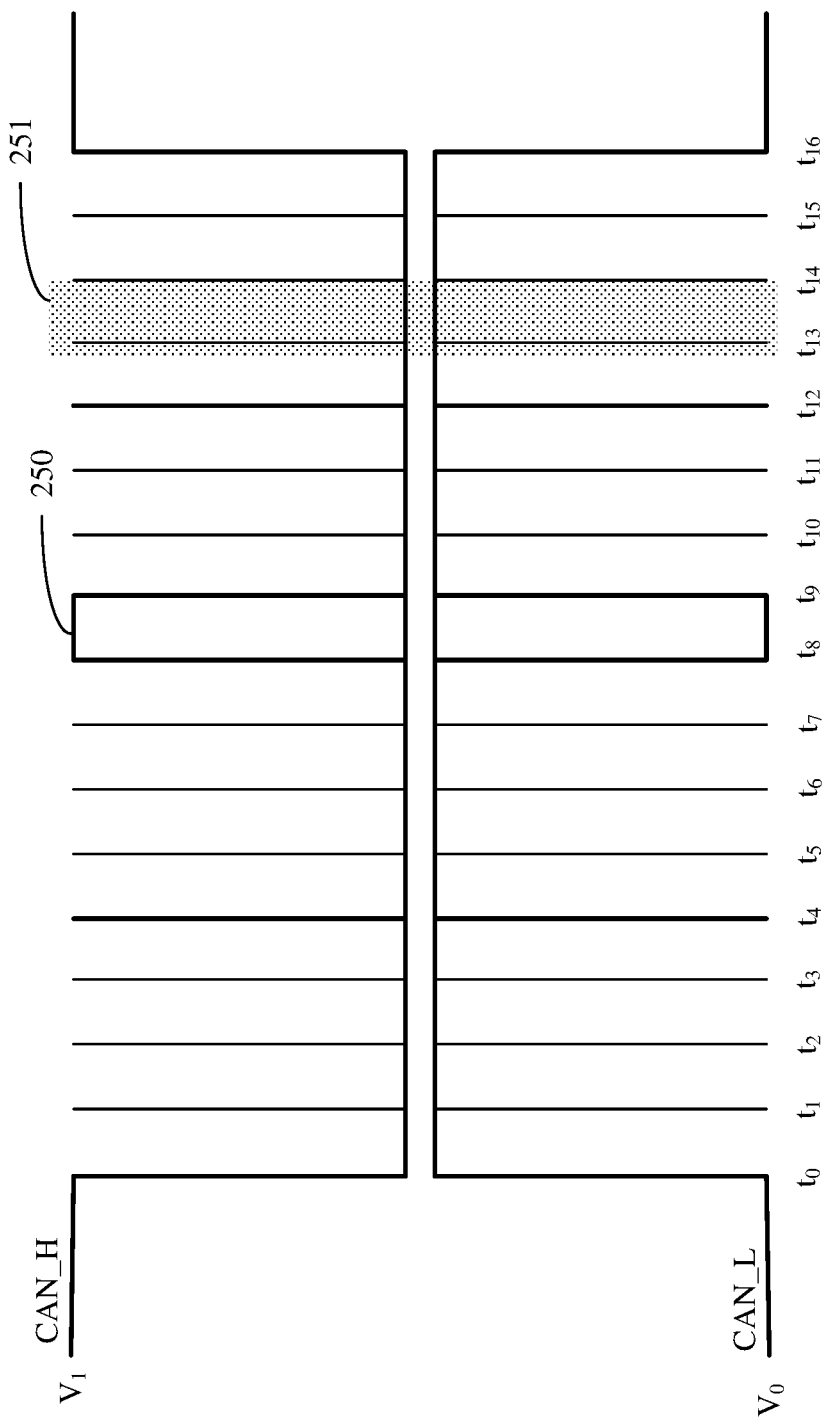
FIG. 4 is an example showing the injection of a dominant pulse onto a CAN bus, within a CAN message transmitted by an electronic control unit (ECU) under test.

FIG. 4 is a diagram showing one example of a bit transmitted within a CAN message. In the example shown in FIG. 4, the signal varies between voltage $v_0$ and $v_1$, which is represented along the y-axis. Two CAN signals are transmitted, CAN_H and CAN_L. The dominant or recessive state is represented by voltage difference between the CAN_H and CAN_L signals. A dominant state is represented by a larger voltage difference between CAN_H and CAN_L, while a recessive state is represented by a smaller voltage difference between CAN_H and CAN_L. The time quanta t0-t16 are shown along the x-axis, which represents time. t0 marks the start of a recessive bit that was transmitted as part of the CAN message being analyzed. It can be seen that the recessive bit has a bit length (or bit period) of t0-t16. In one example, a desired sample point range 251 is shown from t13-t14. This represents a portion of the bit length t0-t16 where the CAN signals have settled, but sufficiently before the next transition. Thus, the bit value, at the point t13-14 is unlikely to be corrupted by transients on the network.

FIG. 4 also shows that a dominant pulse is injected as illustrated by 250. In the example shown in FIG. 4, the dominant pulse 250 is injected at a location within the bit length that is slightly before t8 to approximately t9. This means that sampling delay time generator 142 has set a time delay value from t0 to a time position slightly before t8 in the bit length t0-t16. Assuming that the sample point range 251 of the transmitting ECU 102 corresponds to the time period t13-t14, then the transmitting ECU 102 would not see the dominant pulse 250, because it is outside the sample point range 251 for ECU 102. In that case, ECU 102 will continue transmitting, ignoring the dominant pulse 250.

However, assume that the dominant pulse 250 is injected at a time point that corresponded to t13-t14. In that case, because the transmitting ECU 102 is transmitting a recessive bit, and it detected a dominant pulse at its sample point, the transmitting ECU 102 stops transmitting. If the bit under analysis is in the arbitration field of the CAN message, then the transmitting ECU 102 assumes that it lost the arbitration, and stops transmitting (or continuously transmits a recessive value). If the bit under analysis is in the data portion of the CAN message, then the transmitting ECU 102 stops transmitting (begins transmitting a recessive value) and generates a CAN error.

FIG. 4 also shows how sample point characterization system 148 can control computing system 108 to characterize the sample point of the transmitting ECU 102, other than to simply identify its location. For example, if sample point characterization system 148 is configured to identify the variation in the locations of the sample point of different ECUs, then it can control sampling delay time generator 142 and dominant pulse injector 144 to begin injecting the dominant pulse 250 at a time before t13. It can then increase the delay until the dominant pulse 250 is injected across the whole acceptable range t13-t14. By contrast, it can control the sampling delay time generator 142 to increase the delay to a position after t14 and then to begin decreasing the delay until the dominant pulse 250 is injected across the acceptable range 251.

In this way, variation identifier 172 can control computing system 108 so that it identifies the earliest sample point (e.g., t13) and the latest sample point (e.g., t14) of all the ECUs on the network. Of course, these are only examples of how sample point characterization system 148 can control computing system 108 to characterize the sample point of the transmitting ECU 102. It can be done in other ways as well.

It can thus be seen that the present description proceeds with respect to a system and method for identifying the location of a sample point used by a transmitting ECU. The present description can also be used to further characterize the sample point, such as by identifying its variation, the resolution of the transmitting ECU, and other things.

The present discussion has mentioned processors and servers. In one example, the processors and servers include computer processors with associated memory and timing circuitry, which may not be separately shown. They are functional parts of the systems or devices to which they belong and are activated by, and facilitate the functionality of the other components or items in those systems.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 5:
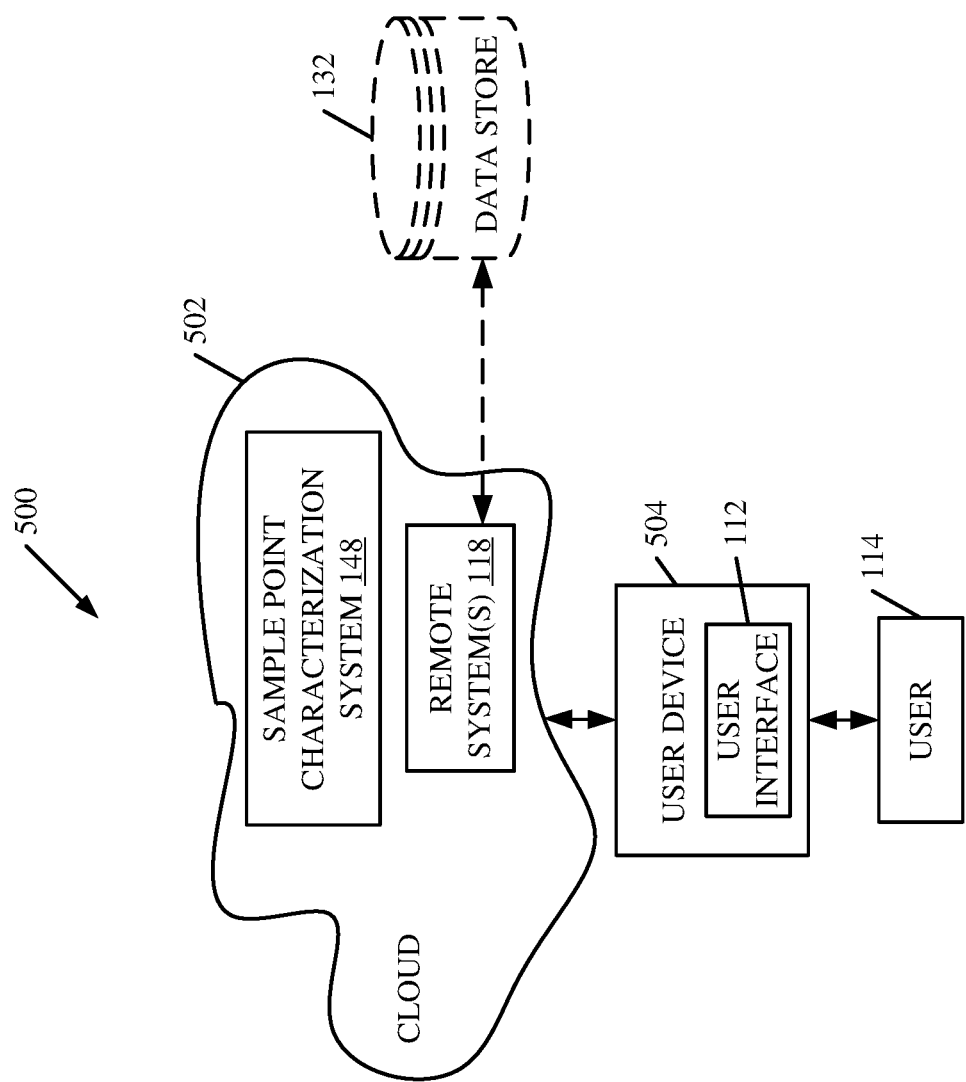
FIG. 5 is a block diagram showing one example of the architecture illustrated in FIG. 1, deployed in a remote server environment.

FIG. 5 is a block diagram of architecture 100, shown in FIG. 1, except that it communicates with elements in a remote server architecture 500. In an example, remote server architecture 500 can provide computation, software, data access, and storage services that do not require end-user knowledge of the physical location or configuration of the system that delivers the services. In various examples, remote servers can deliver the services over a wide area network, such as the internet, using appropriate protocols. For instance, remote servers can deliver applications over a wide area network and they can be accessed through a web browser or any other computing component. Software or components shown in FIG. 1 as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions described herein can be provided from a remote server at a remote location using a remote server architecture. Alternatively, they can be provided from a conventional server, or they can be installed on client devices directly, or in other ways.

In the example shown in FIG. 5, some items are similar to those shown in FIGS. 1 and 2 and they are similarly numbered. FIG. 5 specifically shows that sample point characterization system 148 or other items from architecture 100, can be located at a remote server location 502. Therefore, system 108 accesses those systems through remote server location 502.

FIG. 5 also depicts another example of a remote server architecture. FIG. 5 shows that it is also contemplated that some elements of FIGS. 1 and 2 are disposed at remote server location 502 while others are not. By way of example, data store 132 or remote systemsms118 can be disposed at a location separate from location 502, and accessed through the remote server at location 502. Regardless of where they are located, they can be accessed directly by architecture 100, through a network (either a wide area network or a local area network), they can be hosted at a remote site by a service, or they can be provided as a service, or accessed by a connection service that resides in a remote location. Also, the data can be stored in substantially any location and intermittently accessed by, or forwarded to, interested parties. All of these architectures are contemplated herein.

It will also be noted that the elements of FIGS. 1 and 2, or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 6:
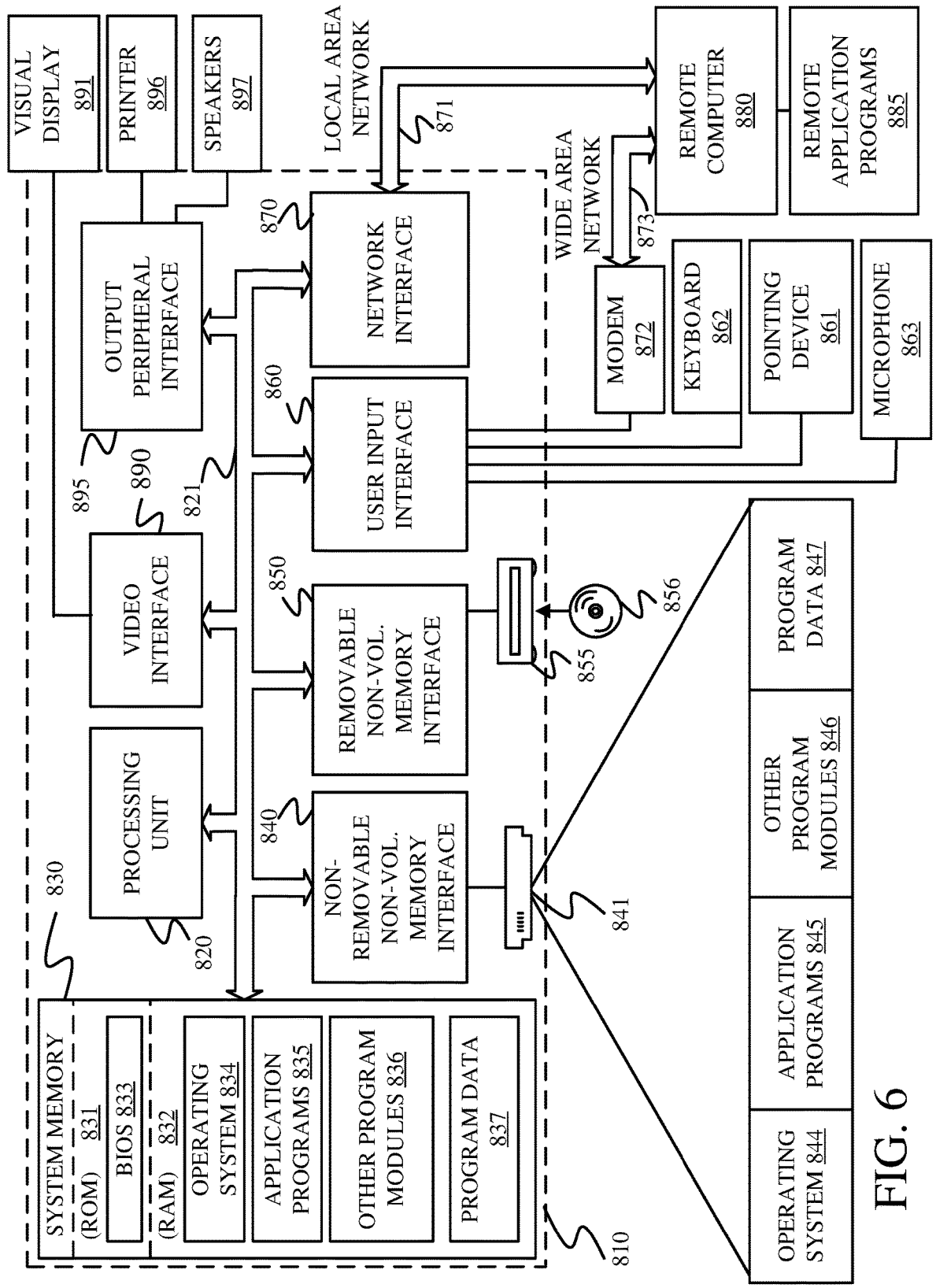
FIG. 6 is a block diagram showing one example of a computing environment that can be used in the architectures shown in the previous figures.

FIG. 6 is one example of a computing environment in which elements of FIGS. 1 and 2, or parts of them, (for example) can be deployed. With reference to FIG. 6, an example system for implementing some embodiments includes a computing device in the form of a computer 810 programmed to operate as described herein. Components of computer 810 may include, but are not limited to, a processing unit 820 (which can comprise processor(s) 130), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to FIGS. 1 and 2 can be deployed in corresponding portions of FIG. 6.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 6 illustrates operating system 834, application programs 835, other program modules 836, and program data 837.

The computer 810 may also include other removable/non-removable volatile/nonvolatile computer storage media. By way of example only, FIG. 10 illustrates a hard disk drive 841 that reads from or writes to non-removable, nonvolatile magnetic media, an optical disk drive 855, and nonvolatile optical disk 856. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 6, provide storage of computer readable instructions, data structures, program modules and other data for the computer 810. In FIG. 6, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a controller area network—CAN, local area network—LAN, or wide area network WAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 6 illustrates, for example, that remote application programs 885 can reside on remote computer 880.

It should also be noted that the different embodiments described herein can be combined in different ways. That is, parts of one or more embodiments can be combined with parts of one or more other embodiments. All of this is contemplated herein.

Example 1 is a computer implemented method, comprising:

receiving a controller area network (CAN) message from a transmitting electronic control unit (ECU) over a CAN bus;

detecting a recessive bit, having a recessive bit length, in the CAN message;

injecting a dominant pulse onto the CAN bus, after a delay time, within the bit length;

detecting a behavior of the transmitting ECU after injection of the dominant pulse;

characterizing a sample point of the transmitting ECU, to obtain a sample point characteristic, based on the delay time and the detected behavior of the transmitting ECU; and generating a control signal based on the sample point characteristic.

Example 2 is the computer implemented method of any or all previous examples wherein detecting the behavior of the transmitting ECU comprises:

determining whether the transmitting ECU stops transmitting the CAN message in response to injection of the dominant pulse.

Example 3 is the computer implemented method of any or all previous examples wherein characterizing the sample point of the transmitting ECU comprises:

if the transmitting ECU stops transmitting the CAN message in response to injection of the dominant pulse, then identifying a location of the sample point of the transmitting ECU, in the recessive bit length, based on the delay time within the recessive bit length.

Example 4 is the computer implemented method of any or all previous examples wherein characterizing the sample point of the transmitting ECU comprises:

if the transmitting ECU does not stop transmitting the CAN message in response to injection of the dominant pulse, then:

changing the delay time to a different delay time;

receiving a different CAN message from the transmitting ECU;

detecting a recessive bit, having a recessive bit length, in the different CAN message;

injecting a dominant pulse onto the CAN bus, after the different delay time, within the recessive bit length;

detecting a behavior of the transmitting ECU after injection of the dominant pulse; and characterizing the sample point of the transmitting ECU, to obtain the sample point characteristic, based on the different delay time and the detected behavior of the transmitting ECU.

Example 5 is the computer implemented method of any or all previous examples wherein characterizing the sample point of the transmitting ECU comprises:

if the transmitting ECU does not stop transmitting the CAN message in response to injection of the dominant pulse, then:

repeating steps of varying the delay time to obtain a different delay time, detecting a recessive bit in a different CAN message and injecting the dominant pulse during the recessive bit after the different delay time, until the transmitting ECU stops transmitting the CAN message in response to injection of the dominant pulse; and identifying the location of the sample point for the transmitting ECU, in the recessive bit length, based on a value of the delay time when the transmitting ECU stops transmitting the CAN message in response to the injection of the dominant pulse.

Example 6 is the computer implemented method of any or all previous examples wherein the CAN message includes an ECU identifier portion that identifies the transmitting ECU, and a data portion, and wherein detecting a recessive bit comprises:

detecting a recessive bit after the ECU identifier portion of the CAN message.

Example 7 is the computer implemented method of any or all previous examples wherein the transmitting ECU is on a network that includes another ECU and wherein characterizing the sample point of the transmitting ECU comprises:

identifying the transmitting ECU based on the ECU identifier portion of the CAN message.

Example 8 is the computer implemented method of any or all previous examples wherein detecting a behavior of the transmitting ECU comprises:

detecting that the transmitting ECU generated a CAN error in response to injection of the dominant pulse.

Example 9 is the computer implemented method of any or all previous examples wherein generating a control signal comprises:

generating an interface control signal to surface the sample point characteristic for the transmitting ECU on a user interface.

Example 10 is the computer implemented method of any or all previous examples wherein generating the control signal comprises:

generating a control signal to automatically reconfigure the transmitting ECU to move the sample point of the transmitting ECU to a different location in the recessive bit length.

Example 11 is the computer implemented method of any or all previous examples wherein injecting a dominant pulse comprises injecting a dominant pulse into a recessive bit in a plurality of different CAN messages from the transmitting ECU, each dominant pulse being injected at a different delay time, and wherein characterizing the sample point comprises:

identifying a location of the sample point in the recessive bit length, and identifying a variation of a location of the sample point, for the transmitting ECU, relative to a location for the sample point of the other ECU on the network.

Example 12 is a computing system, comprising:

a recessive bit detector that detects a recessive bit, having a recessive bit length, in a CAN message transmitted by a transmitting electronic control unit (ECU) over a CAN bus;

a dominant pulse injector that injects a dominant pulse onto the CAN bus, after a delay time, within the recessive bit length;

an ECU behavior detector that detects a behavior of the transmitting ECU after injection of the dominant pulse;

a sample point characterization system that characterizes a sample point of the transmitting ECU, to obtain a sample point characteristic, based on the delay time and the detected behavior of the transmitting ECU; and an output generation system that generates a control signal based on the sample point characteristic.

Example 13 is the computing system of any or all previous examples wherein the ECU behavior detector comprises:

a stop transmission detector that detects whether the transmitting ECU stops transmitting the CAN message in response to injection of the dominant pulse.

Example 14 is the computing system of any or all previous examples wherein the sample point characterization system comprises:

a location identifier configured to, if the transmitting ECU stops transmitting the CAN message in response to injection of the dominant pulse, identify a location of the sample point of the transmitting ECU, in the recessive bit length, based on the delay time within the recessive bit length.

Example 15 is the computing system of any or all previous examples wherein the CAN message includes an ECU identifier portion that identifies the transmitting ECU, and a data portion, and wherein the recessive bit detector is configured to detect a recessive bit after the ECU identifier portion of the CAN message.

Example 16 is the computing system of any or all previous examples wherein the transmitting ECU is on a network that includes another ECU and wherein the sample point characterization system comprises:

an ECU identifier that identifies the transmitting ECU based on the ECU identifier portion of the CAN message.

Example 17 is the computing system of any or all previous examples wherein the ECU behavior detector comprises:

a CAN error generation detector that detects that the transmitting ECU generated a CAN error in response to injection of the dominant pulse.

Example 18 is the computing system of any or all previous examples wherein the output generation system comprises:

a configuration change output component that generates a control signal to automatically reconfigure the transmitting ECU to move the sample point of the transmitting ECU to a different location in the recessive bit length.

Example 19 is a computer implemented method, comprising:

receiving a controller area network (CAN) message from a transmitting electronic control unit (ECU) over a CAN bus;

detecting a recessive bit, having a recessive bit length, in the CAN message;

injecting a dominant pulse onto the CAN bus, after a delay time, within the recessive bit length;

determining whether the transmitting ECU stops transmitting the CAN message in response to injection of the dominant pulse;

if the transmitting ECU stops transmitting the CAN message in response to injection of the dominant pulse, then identifying a location of the sample point of the transmitting ECU, in the recessive bit length, based on the delay time within the recessive bit length; and generating a control signal based on the location of the sample point.

Example 20 is the computer implemented method of any or all previous examples and further comprising if the transmitting ECU does not stop transmitting the CAN message in response to injection of the dominant pulse, then:

repeating steps of varying the delay time to obtain a different delay time, detecting a recessive bit in a different CAN message and injecting the dominant pulse during the recessive bit after the different delay time, until the transmitting ECU stops transmitting the CAN message in response to injection of the dominant pulse; and identifying the location of the sample point for the transmitting ECU, in the recessive bit length, based on a value of the delay time when the transmitting ECU stops transmitting the CAN message in response to the injection of the dominant pulse.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer implemented method, comprising:
   receiving a controller area network (CAN) message from a transmitting electronic control unit (ECU) over a CAN bus;
   detecting a recessive bit, having a recessive bit length, in the CAN message;
   injecting a dominant pulse onto the CAN bus, after a delay time, within the recessive bit length;
   detecting a behavior of the transmitting ECU after injection of the dominant pulse;
   characterizing a sample point of the transmitting ECU, to obtain a sample point characteristic, based on the delay time and the detected behavior of the transmitting ECU; and
   generating a control signal based on the sample point characteristic.

2. The computer implemented method of claim 1 wherein detecting the behavior of the transmitting ECU comprises:
   determining whether the transmitting ECU stops transmitting the CAN message in response to injection of the dominant pulse.

3. The computer implemented method of claim 2 wherein characterizing the sample point of the transmitting ECU comprises:
   if the transmitting ECU stops transmitting the CAN message in response to injection of the dominant pulse, then identifying a location of the sample point of the transmitting ECU, in the recessive bit length, based on the delay time within the recessive bit length.

4. The computer implemented method of claim 3 wherein characterizing the sample point of the transmitting ECU comprises:
   if the transmitting ECU does not stop transmitting the CAN message in response to injection of the dominant pulse, then:
      changing the delay time to a different delay time;
      receiving a different CAN message from the transmitting ECU;
      detecting a recessive bit, having a recessive bit length, in the different CAN message;
      injecting a dominant pulse onto the CAN bus, after the different delay time, within the recessive bit length;
      detecting a behavior of the transmitting ECU after injection of the dominant pulse; and
      characterizing the sample point of the transmitting ECU, to obtain the sample point characteristic, based on the different delay time and the detected behavior of the transmitting ECU.

5. The computer implemented method of claim 3 wherein characterizing the sample point of the transmitting ECU comprises:
   if the transmitting ECU does not stop transmitting the CAN message in response to injection of the dominant pulse, then:
      repeating steps of varying the delay time to obtain a different delay time, detecting a recessive bit in a different CAN message and injecting the dominant pulse during the recessive bit after the different delay time, until the transmitting ECU stops transmitting the CAN message in response to injection of the dominant pulse; and
      identifying the location of the sample point for the transmitting ECU, in the recessive bit length, based on a value of the delay time when the transmitting ECU stops transmitting the CAN message in response to the injection of the dominant pulse.

6. The computer implemented method of claim 1 wherein the CAN message includes an ECU identifier portion that identifies the transmitting ECU, and a data portion, and wherein detecting a recessive bit comprises:
   detecting a recessive bit after the ECU identifier portion of the CAN message.

7. The computer implemented method of claim 6 wherein the transmitting ECU is on a network that includes another ECU and wherein characterizing the sample point of the transmitting ECU comprises:
   identifying the transmitting ECU based on the ECU identifier portion of the CAN message.

8. The computer implemented method of claim 1 wherein detecting a behavior of the transmitting ECU comprises:
   detecting that the transmitting ECU generated a CAN error in response to injection of the dominant pulse.

9. The computer implemented method of claim 1 wherein generating a control signal comprises:
   generating an interface control signal to surface the sample point characteristic for the transmitting ECU on a user interface.

10. The computer implemented method of claim 3 wherein generating the control signal comprises:
    generating a control signal to automatically reconfigure the transmitting ECU to move the sample point of the transmitting ECU to a different location in the recessive bit length.

11. The computer implemented method of claim 7 wherein injecting a dominant pulse comprises injecting a dominant pulse into a recessive bit in a plurality of different CAN messages from the transmitting ECU, each dominant pulse being injected at a different delay time, and wherein characterizing the sample point comprises:
    identifying a location of the sample point in the recessive bit length, and identifying a variation of a location of the sample point, for the transmitting ECU, relative to a location for the sample point of the other ECU on the network.

12. A computing system, comprising:
    a recessive bit detector that detects a recessive bit, having a recessive bit length, in a CAN message transmitted by a transmitting electronic control unit (ECU) over a CAN bus;
    a dominant pulse injector that injects a dominant pulse onto the CAN bus, after a delay time, within the recessive bit length;
    an ECU behavior detector that detects a behavior of the transmitting ECU after injection of the dominant pulse;
    a sample point characterization system that characterizes a sample point of the transmitting ECU, to obtain a sample point characteristic, based on the delay time and the detected behavior of the transmitting ECU; and an output generation system that generates a control signal based on the sample point characteristic.

13. The computing system of claim 12 wherein the ECU behavior detector comprises:
a stop transmission detector that detects whether the transmitting ECU stops transmitting the CAN message in response to injection of the dominant pulse.

14. The computing system of claim 13 wherein the sample point characterization system comprises:
a location identifier configured to, if the transmitting ECU stops transmitting the CAN message in response to injection of the dominant pulse, identify a location of the sample point of the transmitting ECU, in the recessive bit length, based on the delay time within the recessive bit length.

15. The computing system of claim 12 wherein the CAN message includes an ECU identifier portion that identifies the transmitting ECU, and a data portion, and wherein the recessive bit detector is configured to detect a recessive bit after the ECU identifier portion of the CAN message.

16. The computing system of claim 15 wherein the transmitting ECU is on a network that includes another ECU and wherein the sample point characterization system comprises:
an ECU identifier that identifies the transmitting ECU based on the ECU identifier portion of the CAN message.

17. The computing system of claim 12 wherein the ECU behavior detector comprises:
a CAN error generation detector that detects that the transmitting ECU generated a CAN error in response to injection of the dominant pulse.

18. The computing system of claim 12 wherein the output generation system comprises:
a configuration change output component that generates a control signal to automatically reconfigure the transmitting ECU to move the sample point of the transmitting ECU to a different location in the recessive bit length.

19. A computer implemented method, comprising:
receiving a controller area network (CAN) message from a transmitting electronic control unit (ECU) over a CAN bus;
detecting a recessive bit, having a recessive bit length, in the CAN message;
injecting a dominant pulse onto the CAN bus, after a delay time, within the recessive bit length;
determining whether the transmitting ECU stops transmitting the CAN message in response to injection of the dominant pulse;
if the transmitting ECU stops transmitting the CAN message in response to injection of the dominant pulse, then identifying a location of the sample point of the transmitting ECU, in the recessive bit length, based on the delay time within the recessive bit length; and
generating a control signal based on the location of the sample point.

20. The computer implemented method of claim 19 and further comprising if the transmitting ECU does not stop transmitting the CAN message in response to injection of the dominant pulse, then:
repeating steps of varying the delay time to obtain a different delay time, detecting a recessive bit in a different CAN message and injecting the dominant pulse during the recessive bit after the different delay time, until the transmitting ECU stops transmitting the CAN message in response to injection of the dominant pulse; and
identifying the location of the sample point for the transmitting ECU, in the recessive bit length, based on a value of the delay time when the transmitting ECU stops transmitting the CAN message in response to the injection of the dominant pulse.

* * * * *